United States Patent [19]
Buckpesch et al.

[11] Patent Number: 5,756,042
[45] Date of Patent: May 26, 1998

[54] PROCESS FOR PRODUCING NON-OXIDIC CERAMIC HAVING A DEFINED THERMAL CONDUCTIVITY

[75] Inventors: Rainer Buckpesch, Hofheim; Hans-Michael Güther, Kelkheim; Christine Köstler, Bad Soden; Andreas Roosen, Hofheim; Katharina Seitz, Frankfurt, all of Germany

[73] Assignee: Hoechst Aktiengesellschaft, Frankdurt am Main, Germany

[21] Appl. No.: 391,229

[22] Filed: Feb. 21, 1995

[30] Foreign Application Priority Data

Feb. 22, 1994 [DE] Germany .................... 44 05 652.4

[51] Int. Cl.⁶ .................................................. C04B 33/32
[52] U.S. Cl. .................... 264/603; 264/620; 264/653; 264/654; 264/658; 264/665
[58] Field of Search .................... 501/96, 126, 153; 264/603, 620, 653, 654, 658, 665

[56] References Cited

FOREIGN PATENT DOCUMENTS

| 276 148 | 7/1988 | European Pat. Off. . |
| 347 552 | 12/1989 | European Pat. Off. . |
| 452 871 | 10/1991 | European Pat. Off. . |
| 301 291 | 11/1992 | Germany . |

*Primary Examiner*—Timothy Speer
*Attorney, Agent, or Firm*—Foley & Lardner

[57] ABSTRACT

A process is proposed for producing non-oxidic ceramic having a thermal conductivity in a predetermined range. A shaped body of non-oxidic ceramic material is heated to remove organic constituents, and is subsequently thermally treated in an oxygen-containing atmosphere to incorporate oxygen atoms into the crystal lattice of the non-oxidic ceramic, with the temperature and/or the hold time at this temperature being selected as a function of the predetermined thermal conductivity range, and the shaped body is finally sintered in a non-oxidizing atmosphere.

17 Claims, No Drawings

PROCESS FOR PRODUCING NON-OXIDIC CERAMIC HAVING A DEFINED THERMAL CONDUCTIVITY

The present invention relates to a process for producing non-oxidic ceramic having a thermal conductivity in a predetermined range, in which a shaped body of non-oxidic ceramic material is heated to remove organic constituents and subsequently sintered in a non-oxidizing atmosphere. The present invention relates in particular to a process for producing aluminum nitride ceramic having a defined thermal conductivity.

In the field of technical ceramics, new materials having highly promising properties have been developed for the electronics industry and also for other specific fields of application. These materials include carbides and nitrides such as silicon carbide, silicon nitride and aluminum nitride. In the electronics industry, increasing miniaturization, higher circuit currents, higher fre- quencies and the increasing loss performance associated therewith made it necessary to develop an insulating but simultaneously thermally conducting material. These requirements are met particularly well by aluminum nitride. With a currently achieved thermal conductivity of 170 W/m.K on average, aluminum nitride combines the insulating properties of aluminum oxide with the thermal conductivity properties of copper. Combined with these properties, it is also possible to produce ceramic shaped bodies of aluminum nitride relatively inexpensively in comparison to competing materials, such as diamond or beryllium oxide.

Numerous publications have already appeared which are concerned with the addition of various materials to non-oxidic ceramics to influence the properties of the ceramic, in particular to achieve a thermal conductivity which is as high as possible. Thus, for example, EP 0 347 552 A2 describes a process for producing non-oxidic ceramic in which a metal compound, inter alia a $NiO-Y_2O_3$ gel is added to the ceramic powder. This is supposed to achieve a higher density during sintering and thus a higher thermal conductivity.

In the process disclosed in EP 0 452 871 A1, carbon, a rare earth oxide and compounds of elements of the groups IVB, VB and VIB of the Periodic Table are added to give a colored aluminum nitride ceramic having a high thermal conductivity.

The addition of extraneous atoms to non-oxidic ceramic alters the polycrystalline microstructure of the ceramic material, so that the increase in the thermal conductivity is associated with a change in the electrical and mechanical properties.

EP 0 276 148 A2 discloses a process for the complete as possible removal of carbon or carbon compounds originating from binders, which materials would otherwise be incompletely driven off during sintering of non-oxidic ceramic in a non-oxidizing atmosphere and would impair the properties of the ceramic. The publication proposes heating the green body prior to sintering in an oxygen-containing atmosphere at temperatures in the range from 430° C. to 820° C. to completely drive off the binder, with any oxidation of the non-oxidic ceramic material being avoided. Both in this publication and also in other literature references it is stated that incorporation of oxygen into the crystal lattice reduces the thermal conductivity of the non-oxidic ceramic.

Besides the main field of use, electronics, there are numerous industrial applications which utilize not only the electrical and thermal properties of the non-oxidic ceramic materials, but also their mechanical properties. In one of these fields of application, the hot knife which is used for burning through the stays of the solar panels of space satellites, it is necessary to set the thermal conductivity of the aluminum nitride ceramic in a predetermined range which does not correspond to the present standard. In general, thermal conductivities of from 70 to 100 W/m.K are required here.

It is an object of the present invention to provide a process of the type mentioned in the introduction, in which a non-oxidic ceramic having a thermal conductivity in a predetermined range is obtained without the electrical and mechanical properties of the non-oxidic ceramic being altered.

Starting out from the process mentioned in the introduction, this object is achieved by thermally treating the shaped body in an oxygen-containing atmosphere after burnout of the organic constituents and prior to sintering to incorporate oxygen atoms into the crystal lattice of the non-oxidic ceramic, with the temperature level and/or the hold time at this temperature being selected as a function of the predetermined thermal conductivity range.

Using this process it is possible, without the ceramic starting material having to be altered by additives, to produce a ceramic having a particular desired thermal conductivity by targeted incorporation of oxygen atoms into the lattice of the non-oxidic ceramic. Hitherto, attempts were always made to influence the thermal conductivity only by additions to the ceramic starting material. However, this can alter the other properties of the ceramic, as has already been mentioned above.

The oxygen atoms incorporated into the lattice in the process of the invention form phonon scattering centers and thus reduce the thermal conductivity. The more oxygen atoms incorporated into the lattice, the lower the thermal conductivities achieved, and vice versa.

Prior to incorporation of the oxygen atoms, the organic constituents are removed from the shaped body, hereinafter also referred to as the green body. These organic constituents are required for the shaping of the ceramic material. These constituents are binders, plasticizers and dispersants. Those skilled in the art will be familiar with these various additives. The binders used can be, for example, polyvinyl alcohols, polyvinyl butyrals and other materials. Customary plasticizers are, for example, dibutyl phthalate, polyethylene glycols, etc. Dispersants used can be surfactants. These organic constituents are driven off on heating the green bodies. The temperature depends on the organic constituents used in each case. In general it is in the range from about 400° C. to 800° C.

In the process of the invention, it is advantageous to also carry out this step of burnout of the organic constituents in an oxygen-containing atmosphere and immediately subsequently carry out the thermal treatment for incorporating the oxygen atoms without intermediate cooling.

On heating the green bodies in an oxygen-containing atmosphere, the organic constituents are first removed without incorporation of oxygen atoms taking place. This process step is described in EP 0 276 148 A2. Consequently, the ceramics produced by this previously known process all have the same thermal conductivity regardless of the temperatures selected in the temperature range from 430° to 820° C. specified therein.

In contrast to this previously known process, according to the invention the thermal treatment in an oxygen-containing atmosphere is continued after removal of the organic constituents to achieve a targeted incorporation of oxygen atoms into the aluminum nitride lattice and thus to set the thermal conductivity to particular values. The temperature level to which the material is heated, and/or the hold time at this temperature, are selected as a function of the desired thermal conductivity of the ceramic. Thus, for example, under otherwise identical conditions of thermal treatment, more oxygen is incorporated at a higher temperature level and thus there is obtained a shaped body having a lower thermal conductivity than at a lower temperature. "Otherwise identical conditions" means the ceramic composition, the heating and cooling rates, the hold time of the temperature, the oxygen content of the atmosphere, moving or static oxygen-containing atmosphere. If instead of the temperature, the hold time at this temperature is altered and the other conditions are left identical, a longer hold time gives a shaped body having a lower thermal conductivity than at shorter hold times. Of course it is also possible to alter the temperature level and the hold time to obtain the desired thermal conductivity.

Depending on the desired thermal conductivity, the temperature level to which heating is carried out can be selected in a temperature range which extends from the temperature which is necessary for removal of the organic constituents to temperatures below the sintering temperature. Temperatures below the temperature required for removal of the organic constituents are not advantageous, since the shaped bodies would have to be cooled somewhat after burnout of the organic constituents. In the case of aluminum nitride, the temperatures selected can be, for example, from about 400° C. to about 1000° C.

As can be seen from the above explanations of the influence of temperature level and hold time, it is possible to obtain shaped bodies having approximately equal thermal conductivity if, in one case, the bodies are heated to a higher temperature level and a shorter hold time is selected and, in the other case, they are heated to a lower temperature level and a longer hold time is selected.

By means of the process of the invention, it is possible to obtain thermal conductivities in a very narrow predetermined range with variations of from about 5 to 10 W/m.K.

The heating and cooling rates have far less influence on the achieved thermal conductivity of the shaped body than do temperature level and hold time. There is a trend to somewhat lower thermal conductivities if very long heating and cooling times are selected. Primarily, the heating rate selected depends on the shape of the green body, in particular its thickness, and on the type and amount of the organic constituents present in the green body. The heating rate must not be so high that the green body is damaged during heating. Likewise, the cooling rate is primarily selected in such a way that it can be withstood by the shaped body, i.e. cooling rates which are too short should be avoided, since they can lead to cracks.

The type of oxygen-containing atmosphere used, such as air or pure oxygen, and also static atmosphere or an oxygen-containing gas stream have only a very small influence on the achieved thermal conductivity of the shaped body. For economic reasons, the process of the invention is preferably carried out in static air.

The process of the invention is particularly suitable for aluminum nitride ceramic. As has already been stated in the introduction, a thermal conductivity of from about 70 to 100 W/m.K is desired, for example, for producing hot knives of aluminum nitride. However, the process of the invention can also be used to produce aluminum nitride ceramics having thermal conductivities lying outside this range.

The green body can be formed using all conventional shaping processes. For aluminum nitride ceramic, the processes used can be, for example, pressing, slip casting and tape casting. Apart from the organic constituents which are necessary for shaping, the ceramic materials can contain sintering aids such as $Y_2O_3$.

After burnout of the organic constituents and the thermal treatment for setting the predetermined thermal conductivity, the shaped body is sintered in the customary manner at temperatures of about 1800° C. or above in a non-oxidizing atmosphere.

The invention is illustrated by means of the following examples.

EXAMPLE 1

A green body in the form of a sheet having a thickness of 1.1 mm was produced by casting. The ceramic material had the following composition:

91% by weight of inorganic ceramic consisting of
  95 % by weight of aluminum nitride
  and 5% by weight of yttrium oxide
  ($Y_2O_3$),
5% by weight of polyvinyl alcohol
3% by weight of dibutyl phthalate
1% by weight of dispersant.

The green sheet was heated in static air to 850° C. over a period of 3 hours in a ramp-controlled furnace and maintained for 2 hours at this temperature. It was then cooled to room temperature over a period of 3 hours. The sheet was sintered for 3 hours at 1820° C. in a nitrogen atmosphere. The thermal conductivity was 45±5 W/m.K. This value is, like all the measurements below, a mean of at least 10 tests.

EXAMPLE 2

The procedure of Example 1 was repeated, but the temperature was 820° C. The substrate obtained had a thermal conductivity of 56±5 W/m.K.

EXAMPLE 3

The procedure of Example 1 was repeated, but the following changes were made in the thermal treatment. The green sheet was heated to 580° C. over a period of 8 hours and maintained at this temperature for 3 hours. This temperature treatment is normally used for green sheets of this type for the burnout of polyvinyl alcohol, dibutyl phthalate and the dispersant before the sheets are sintered.

In the present case, the sheet was further heated to 800° C. and maintained at this temperature for 1 hour. It was subsequently cooled to room temperature over a period of 4 hours. The thermal conductivity of the substrate was 65±5 W/m.K.

EXAMPLE 4

The procedure of Example 1 was repeated, but with the thermal treatment being changed as follows. Heating was carried out to 800° C. over a period of 1.5 hours, the hold time at this temperature was 4 hours. The sheet was subsequently cooled to room temperature over a period of 1.5 hours. The thermal conductivity of the substrate was 65±5 W/m.K.

EXAMPLE 5

The procedure of Example 1 was repeated, but with the following changes in the thermal treatment. The sheet was heated to 800° C. over a period of 3 hours, maintained at this temperature for 2 hours and then cooled to room temperature over a period of 3 hours. The thermal conductivity of the substrate was 80±11 W/m.K.

EXAMPLE 6

The procedure of Example 1 was repeated with the following changes in the thermal treatment. The heating time was 1.5 hours, the temperature 900° C., the hold time 1 hour and the cooling time 1.5 hours. A thermal conductivity of 93±5 W/m.K was achieved.

EXAMPLE 7

The procedure of Example 1 was repeated with the following changes in the thermal treatment. The heating time was 1.5 hours, the temperature 850° C., the hold time 1 hour and the cooling time 1.5 hours. A thermal conductivity of 136±5 W/m.K was achieved.

EXAMPLE 8

The procedure of Example 1 was repeated with the following changes in the thermal treatment. The heating time was 8 hours, the temperature 580° C., the hold time 8 hours and the cooling time 4 hours. A thermal conductivity of 160±5 W/m.K was achieved.

We claim:

1. A process for producing a non-oxidic ceramic having a thermal conductivity in a predetermined range comprising:

heating a shaped body of non-oxidic ceramic material having organic constituents to remove organic constituents;

thermally treating the heated body in an oxygen-containing atmosphere to incorporate oxygen atoms into the lattice of the non-oxidic ceramic at a time and temperature from about 400° C. to less than about 800° C. to thereby set the thermal conductivity in the predetermined range; and sintering the thermally treated body in a non-oxidizing atmosphere.

2. A process as claimed in claim 1, wherein the heating to remove organic constituents is carried out in an oxygen-containing atmosphere.

3. A process as claimed in claim 1, wherein the non-oxidic ceramic material comprises aluminum nitride.

4. A process as claimed in claim 1, wherein the predetermined range is from about 45 W/m.K to about 160 W/m.K.

5. A process as claimed in claim 4, wherein the predetermined range is from about 56 W/m.K to about 136 W/m.K.

6. A process as claimed in claim 5, wherein the predetermined range is from about 70 W/m.K to about 100 W/m.K.

7. A process as claimed in claim 1, wherein the thermal treatment for incorporating oxygen atoms into the lattice of the non-oxidic ceramic is carried out in static air.

8. A process as claimed in claim 1, wherein the sintering is carried out at a temperature of at least about 1800° C.

9. A process as claimed in claim 1, wherein the thermal treatment for incorporating oxygen atoms into the lattice of the non-oxidic ceramic is carried out at a temperature between the heating temperature and the sintering temperature.

10. A process as claimed in claim 1, wherein the thermal treatment comprises holding the heated body at a temperature and period of time selected as a function of the predetermined range.

11. A process as claimed in claim 10, wherein the period of time is from about 1 hour to about 8 hours.

12. A process as claimed in claim 1, further comprising cooling the thermally treated body prior to sintering.

13. A process as claimed in claim 11, wherein the non-oxidizing atmosphere comprises nitrogen.

14. A process as claimed in claim 11, wherein the shaped body is heated in an oxygen-containing atmosphere to remove organic constituents and the heated body is thermally treated in an oxygen-containing atmosphere to incorporate oxygen atoms into the lattice of the non-oxidic ceramic without intermediate cooling of the shaped body.

15. A process as claimed in claim 11, further comprising cooling the heated body prior to the thermal treatment.

16. A process for producing a non-oxidic ceramic having a thermal conductivity in a predetermined range comprising:

heating in an oxygen-containing atmosphere a shaped body of non-oxidic ceramic material having organic constituents to remove organic constituents and to incorporate oxygen atoms into the lattice of the non-oxidic ceramic at a time and temperature from about 400° C. to less than about 800° C. to thereby set the thermal conductivity in the predetermined range; and sintering the heated body in a non-oxidizing atmosphere.

17. A process as claimed in claim 16, further comprising cooling the heated body prior to sintering.

* * * * *